United States Patent
Liao (12)

(10) Patent No.: US 6,503,357 B1
(45) Date of Patent: Jan. 7, 2003

(54) MANUFACTURING PROCESS OF PATIO TABLETOP GLASS WITH BROKEN PROTECTION

(76) Inventor: Cheng Kun Liao, 2509 Strozier Ave., S. El Monte, CA (US) 91733

( * ) Notice: Subject to any disclaimer, the term of this patent is extended or adjusted under 35 U.S.C. 154(b) by 188 days.

(21) Appl. No.: 09/650,253

(22) Filed: Aug. 29, 2000

Related U.S. Application Data

(63) Continuation-in-part of application No. 09/206,922, filed on Dec. 7, 1998, now abandoned.

(51) Int. Cl.[7] ............................................. B32B 31/18
(52) U.S. Cl. ..................... 156/253; 156/267; 156/324; 156/293; 428/131; 428/137; 428/215; 428/426
(58) Field of Search ........................ 156/99, 101, 103, 156/106, 253, 267, 324, 293, 104; 428/131, 137, 426, 430, 214, 215; 65/60.3, 112

(56) References Cited

U.S. PATENT DOCUMENTS 4,805,541 A  *  2/1989  Drane et al. ............ 108/157.15
4,952,459 A  *  8/1990  Thatcher ..................... 428/212
5,645,940 A  *  7/1997  Teddington et al. ........ 156/103

* cited by examiner

*Primary Examiner*—Michael W. Ball
*Assistant Examiner*—Jessica Rossi
(74) *Attorney, Agent, or Firm*—Raymond Y. Chan; David & Raymond Patent Group

(57) ABSTRACT

A manufacturing process of a patio tabletop glass with broken protection includes the steps of fully cleaning at least a top surface of a tempered glass layer which has a central hole thereon, drying the cleaned tempered glass layer, heating the entire tempered glass layer to a temperature between 45° C. to 65° C.; evenly applying a layer of acrylic adhesive on the top surface of the tempered glass layer which temperature is maintained between 45° C. to 65° C. to form the adhesive layer; attaching the protection layer on the tempered glass layer, cutting excessive edges of the protection layer to a size identical to the tempered glass layer; and forming a center hole on the protection layer, which coaxially aligns with the central hole of the tempered glass layer. Accordingly, even when the patio table top is broken into pieces and particles, the broken glass pieces and particles will not be breaking apart and remain attaching to a protection layer.

19 Claims, 4 Drawing Sheets

MANUFACTURING PROCESS OF PATIO TABLETOP GLASS WITH BROKEN PROTECTION

CROSS REFERENCE OF RELATED APPLICATION

This is a Continuation-In-Part Application of a non-provisional application, application Ser. No. 09/206,922, filed Dec. 07, 1998, now abandoned.

FIELD OF THE PRESENT INVENTION

The present invention relates-to an outdoor tabletop glass, and more particularly to a manufacturing process of patio tabletop glass with broken protection to prevent the broken glass particles from hurting the users when the patio tabletop glass is accidentally broken.

BACKGROUND OF THE PRESENT INVENTION

Patio table is one of the most popular outdoor furniture, which normally is placed on the patio or in the back yard for the users to rest and serve barbecue. For easy cleaning, decorating and other reasons, most patio table has a glass made tabletop. The tabletop glass, which is simply placed on top of a table frame, generally has a central hole adapted to hold an umbrella in position for sunshine shading.

The biggest shortcoming of the patio tabletop glass is its fragile nature especially when using outdoors. It is reported that even though most of the patio tabletop glasses are made of tempered glass, the patio tabletop. glass may be broken when its surface is impacted with a sharp object; when it falls on the ground; or when a small stone hits on it in high speed. The central hole of the patio tabletop glass is the most weakened area because of the high concentrate stress occurred around the hole. Besides, when wild wind blows on the opened umbrella, it may cause the whole patio table to fall down and break the tabletop glass.

No matter if the patio tabletop glass is broken by any aforesaid reason or other unexpected reasons, the glass is broken into particles and/or pieces with sharp edges that may cause serious body injury to the users, especially to the minors. However, no glass is unbreakable. Thus, the applicant of the present invention seeks a different way to resolve the above problem, i.e. to prevent the broken glass pieces and particles from breaking apart.

SUMMARY OF THE PRESENT INVENTION

It is thus a first object of the present invention to provide a patio tabletop glass with broken protection and the manufacturing process thereof, wherein even when the patio tabletop glass is broken into pieces and particles, the broken glass pieces and particles will not break apart and remain attached to a protection layer.

A further object of the present invention is to provide a manufacturing process of patio tabletop glass which is fast and inexpensive and adapted for mass production.

Another object of the present invention is to provide a manufacturing process of patio tabletop glass with broken protection, which provides a process of forming a central hole on a protection layer after it is firmly adhered on a tempered glass layer without causing an elongated bubble popping up between the tempered glass layer and the protective layer and extending from the edge of the central hole to the peripheral edge of the tabletop glass.

Another object of the present invention is to provide a patio tabletop glass with broken protection, wherein the round edge of the center hole of the protection layer is made to form a protective edge extended around the central hole of the tempered glass layer which is the most weakened area because of the high concentrate stress occurred around the central hole.

Accordingly, in order to accomplish the above objects, the present invention provides a patio tabletop glass with broken protection, which comprises a tempered glass layer having a predetermined shape and size, a protection layer made of polyvinyl chloride or polyester sheet having a thickness of 0.3 to 0.8 mm and a shape and size adapted to cover a top surface of the tempered glass layer, and an adhesive layer which has a preferred thickness between 0.1 to 0.2 mm and is made of acrylic adhesive and the like being evenly applied between the top surface of the tempered glass layer and a bottom surface of the protection layer so as to integrally adhere the protection layer with the tempered glass layer to form an one piece body, wherein the patio tabletop glass is manufactured by the steps of:

(a) fully cleaning at least the top surface of the tempered glass layer which has a central hole thereon with neutral water having a pH of 7 so as to remove any possible oil is thereon;

(b) drying the cleaned tempered glass layer;

(c) heating the entire tempered glass layer to a temperature between 45° C. to 65° C.;

(d). evenly applying a kind of acrylic adhesive on the top surface of the tempered glass layer which temperature is maintained between 45° C. to 65° C. to form the adhesive layer;

(e) attaching the protection layer having a thickness of 0.3 to 0.8 mm and a width size larger than the tempered glass layer on top of the adhesive layer of the tempered glass layer by pressing the protection layer against the top surface of the tempered glass layer which is maintained at the temperature of 45° C. to 65° C. until the protection layer is integrally attached on the tempered glass layer, wherein the protection layer has a circular center portion formed above the central hole of the tempered glass layer;

(f) cutting excessive edges of the protection layer to a size identical to the tempered glass layer; and (g) forming a center hole on the protection layer, which coaxially aligns with the central hole of the tempered glass layer.

DETAILED DESCRIPTION OF THE PREFERRED EMBODIMENT

Figure 1:
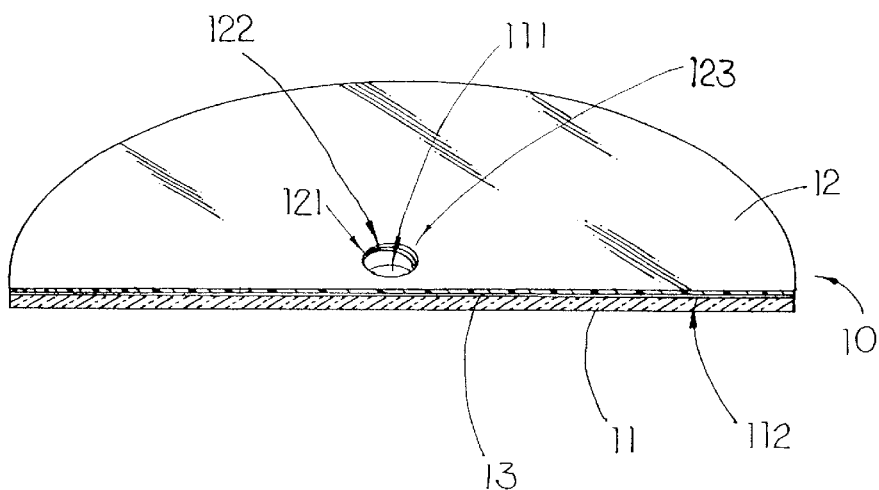
FIG. 1 is a sectional view of the patio tabletop glass in accordance with the above preferred embodiment of the present invention.
Figure 2:
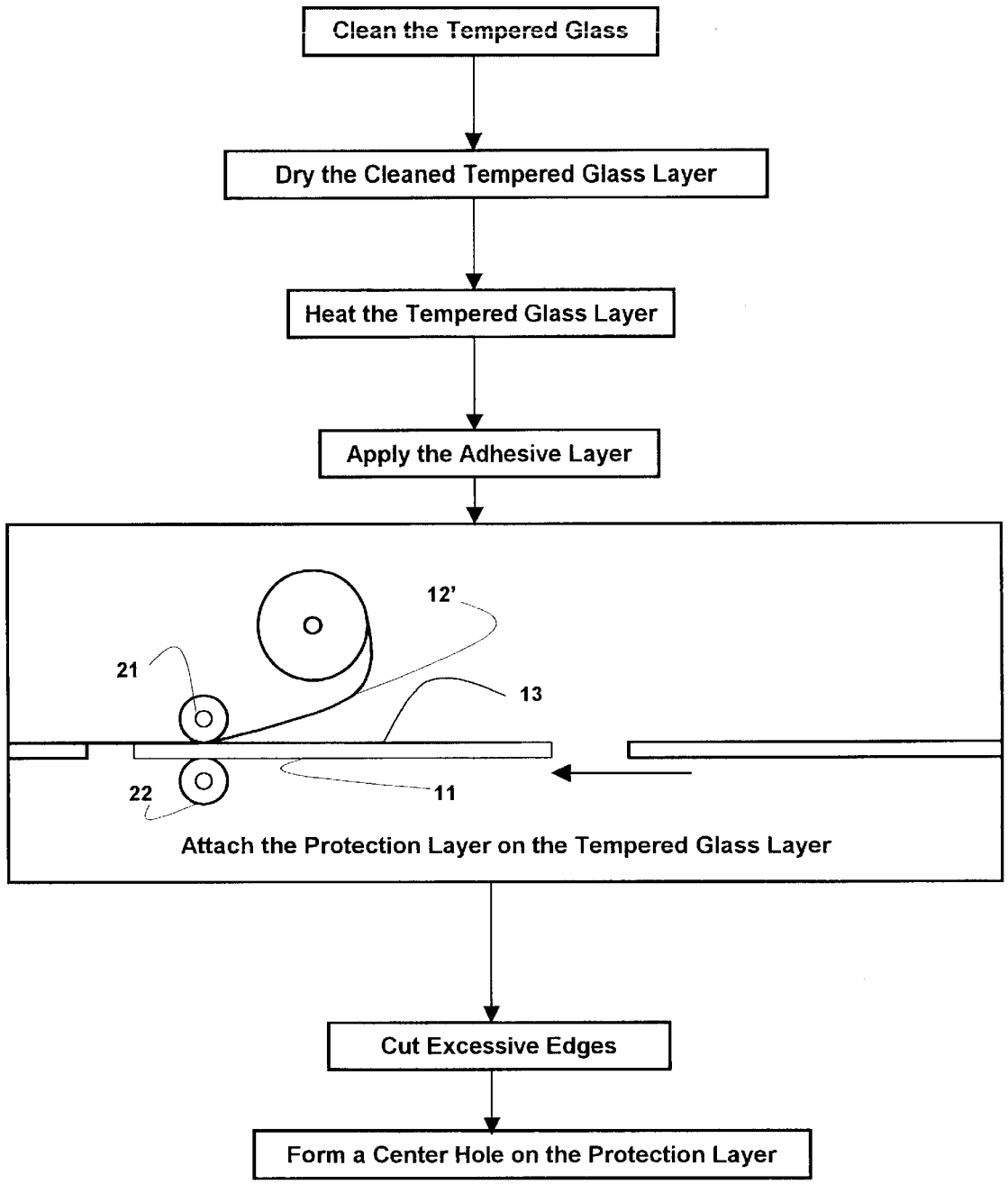
FIG. 2 is a flow diagram of a manufacturing process for producing a patio tabletop glass in accordance with a preferred embodiment of the present invention.

Referring to FIGS. 1 and 2, a preferred embodiment of the present invention is illustrated. As shown in FIG. 2, a patio tabletop glass 10 of the present invention comprises a tempered glass layer 11, a protection layer 12 and an adhesive layer 13. The tempered glass layer 11 has a predetermined shape, thickness and width size and a central hole 111 provided thereon. The protection layer 12 is made of polyvinyl chloride or polyester sheet having a thickness of 0.3 to 0.8 mm and a shape and width size identical to that of the tempered glass layer 11.

The tempered glass layer 11 is generally made of figured glass that has an uneven top surface 112 having specific decorative pattern. The protection layer 12 is integrally attached on the top surface 112 of the tempered glass layer 11 and has a center hole 121 formed thereon, wherein the center hole 121 of the protection layer 12 has an identical diameter of the central hole 111 and is coaxially aligned with the central hole 111 of the tempered glass layer 11. The adhesive layer, which has a preferred thickness between 0.1 to 0.2 mm and is made of acrylic adhesive and the like, is evenly applied between the top surface 112 of the tempered glass layer 11 and a bottom surface 122 of the protection layer 12 so as to integrally adhere the protection layer 12 with the tempered glass layer 11 to form an one piece body. Moreover, the tension of a periphery portion 123 of the protection layer 12 is increased to form a protective edge 124, i.e. the round edge of the center hole 121, which is made to extend around the central hole of the tempered glass layer which is the most weakened area because of the high concentrate stress occurred around the central hole, and to ensure the periphery portion 123 of the protection layer 12 around the center hole 121 securely attached around the central hole 111 on the tempered glass layer 11.

For mass production, as shown in FIGS. 1 to 5, the structure of patio tabletop glass 10 as described above can be made according to the following steps:

(a) Provide a plurality of the tempered glass layers 11 each having the predetermined shape and width size as well as the central hole 111 provided thereon.

The step (a) further comprises the steps of cutting large piece of glass board to form a circular shaped glass layer having the specific decorative pattern provided on at least the top surface 112, drilling the central hole 111 on the glass layer and tempering the glass layer by heating the glass layer to about 500° C. –550° C. and then immediately cooling down to 0° C. –40° C. to form the tempered glass layer 11.

(b) Fully clean at least the top surface 112 of each of the tempered glass layers 11 with neutral water having a pH of 7 so as to remove any possible oil thereon.

(c) Dry all cleaned tempered glass layers 11.

(d) Heat each of the tempered glass layers 11 entirely to a temperature between 45° C. to 65° C.

(e) Attach the protection layer 12 having a thickness of 0.3 to 0.8 mm and a width size larger than the tempered glass layer 11 on the top of the adhesive layer 13 of the tempered glass layer 11 by pressing the protection layer 12 against the top surface 112 of the tempered glass layer 11 which is maintained at the temperature of 45° C. to 65° C. until the protection layer 12 is integrally attached on the tempered glass layer 11, wherein the protection layer 11 has a circular center portion 120 formed above the central hole 111 of the tempered glass layer 11.

As shown in FIG. 2, the step (e) further comprises the following steps:

(e-1) Evenly apply a layer of acrylic adhesive or the like on the top surface 112 of each of the tempered glass layers 11 which temperature is maintained between 45° C. to 65° C. to form the adhesive layer 13 having the thickness of 0.1 to 0.2 mm.

(e-2) Provide a roll of continuous protection layer 12' having the thickness of 0.3 to 0.8 mm and a width size larger than that of the tempered glass layers 11.

The bottom surface of the continuous protection layer 12' may also provided with a layer of acrylic adhesive or the like to facilitate the continuous protection layer 12' to adhere to the tempered glass layers 11.

(e-3) Feed one end of the protection layer 12' and the plurality of tempered glass layers 11 one after one between a pair of parallel rubber rollers 21, 22, wherein the continuous protection layer 12' is attached on the top of the adhesive layers 13 of the tempered glass layers 11 in overlapped manner. The pair of parallel rubber rollers 21, 22 are arranged to press the continuous protection layer 12' against the top surfaces 111 of the tempered glass layers 11, which are still maintained at the temperature of 45° C. to 65° C., until the continuous protection layer 12' is integrally adhered on the top surface 112 of each of the tempered glass layers 11.

Figure 3:
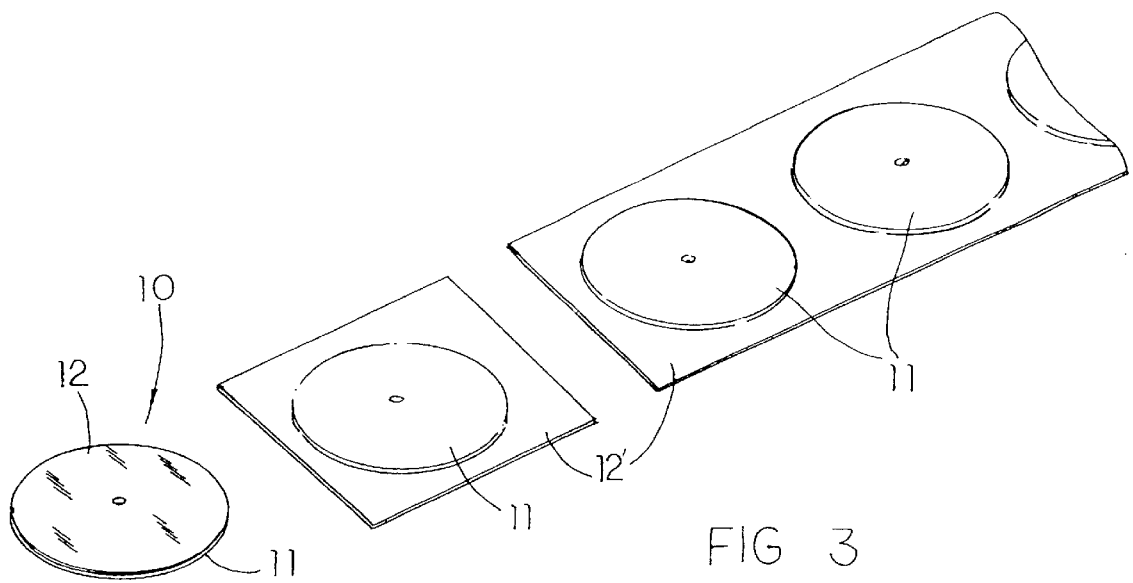
FIG. 3 is a perspective view illustrating the cutting step in accordance with the above preferred embodiment of the present invention.

(e-4) As shown in. FIG. 3, cut off the continuous protection layer 12' according to the number of the tempered glass layers 111 into a plurality of the protection layers 12.

(f) As shown in FIG. 3. cut away the excessive edges of each of the protection layers 12 to a size identical to the respective tempered glass layer 11.

(g) As shown in FIGS. 2 and 3, form the center hole 121 on each of the protection layers 12 to coaxially align with the central hole 112 of the respective tempered glass layer 11 to form the patio tabletop glass 10.

According to the present invention, the step (g) further comprises the steps of:

(g-1) pressing the center portion 120 of the protection layer 12 toward the central hole 111 of the tempered glass layer 11 that increases the tension of a peripheral portion 123 of the protection layer 12 attached around the central hole 111 of the tempered glass layer 11 to ensure the peripheral portion 123 of the protection layer 12 extending and attaching to an upper edge of the central hole 111 of the tempered glass layer 11; and (g-2) grinding the upper edge of the central hole 111 of the tempered glass layer 11 until the center portion 120 of the protection layer 12 is separated from the protection layer 12 to form a center hole 121 coaxially aligned with the central hole 111 of the tempered glass layer 11.

Figure 5:
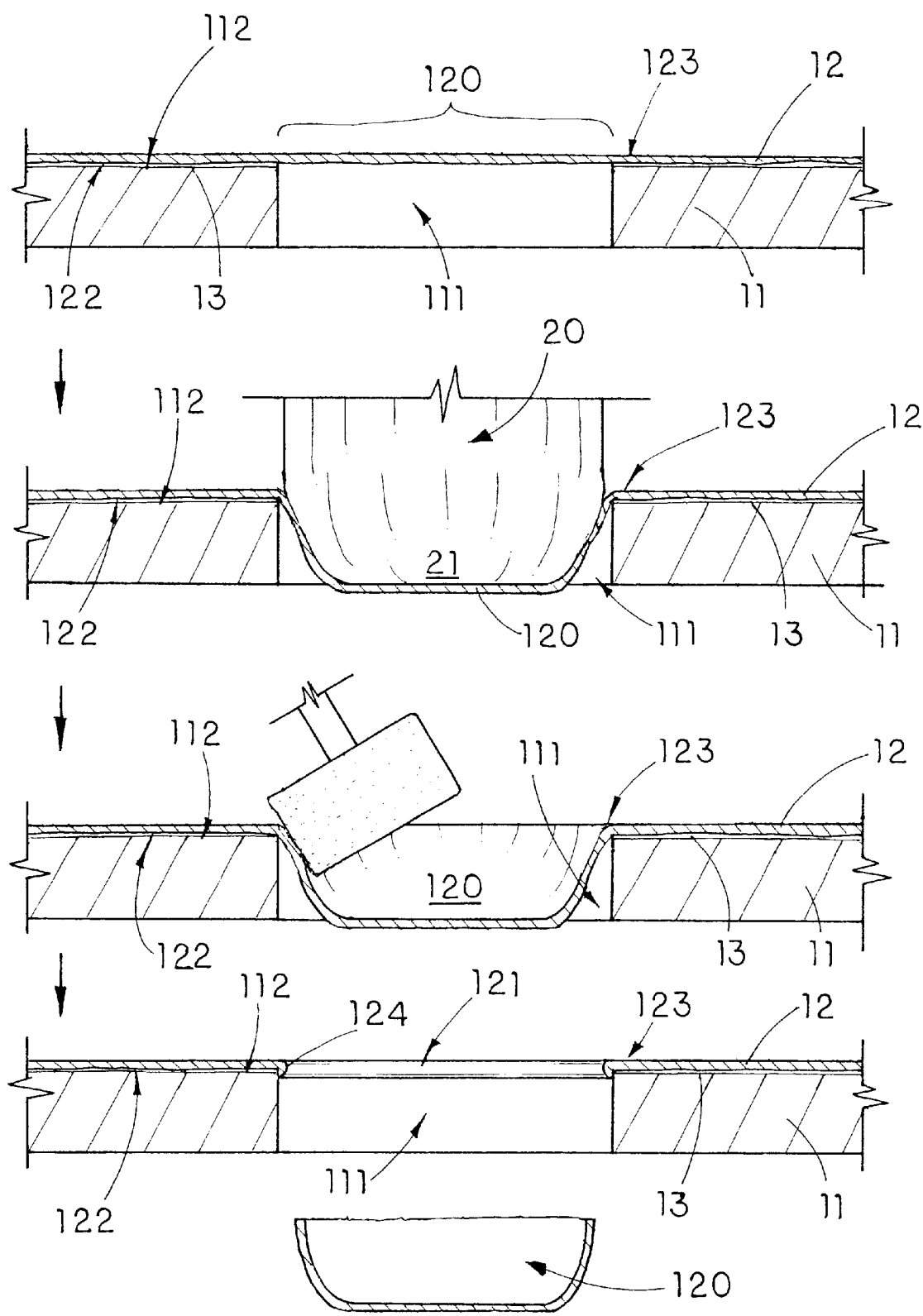
FIG. 5 is a flow diagram of a process of forming the center hole on the protection layer in accordance with the above preferred embodiment of the present invention.

The step (g), as shown in FIG. 5, is a specific step designed to form the center hole 121 for the present invention. It should be noted that the center portion 120 is not directly cut from the protection layer 12 to form the center hole 121. It is because if the center portion 120 is directly cut out from the protection layer 12, the peripheral edge of the center hole 121 will not be fittedly attached to the upper edge of the central hole 111, so that further grinding step may be required to remove the cutting edge of the center hole 121. Moreover, to directly cut out the center portion 120 from the protection layer 12 will frequently cause an elongated bubble popping up between the tempered glass layer 11 and the protective layer 12 and extending from the edge of the central hole to the peripheral edge of the tabletop glass.

According to the present invention, no cutting is required to form the center hole 121, wherein in the step (g-1), as shown in FIG. 5, a press mold 20, which has a round shaped presser head 21 at one end thereof, is used to coaxially press against the center portion 120 by. pressing into the center portion 120 into the central hole 111 of the tempered glass layer 11. The inward pressing force of the pressing head 21 increases the tension of the peripheral portion 123 of the protection layer 12. Also, since the bottom surface 122 of the protection layer 12 may also provided with adhesive layer, the inward pressing force of the pressing head 21 will further press the peripheral portion 123 of the protection layer 12 to extend and attach to the upper edge of the central hole 111 of the tempered glass layer 11.

Then, in the step (g-2), a rotating sand wheel is used to grind at the position of the corresponding upper edge of the central hole 111 so as to reduce the thickness of the peripheral edge of the center portion 120 until the center portion 120 of the protection layer 12 is separated from the protection layer 12 to form a center hole 121 coaxially aligned with the central hole 111 of the tempered glass layer 11. To form the center hole 121 by the pressing and grinding steps in step (g) can, at the same time, substantially eliminate uneven adhering tension of the protection layer 12 to prevent the elongated bubbles popping up between the tempered glass layer 11 and the protective layer 12.

Figure 4:
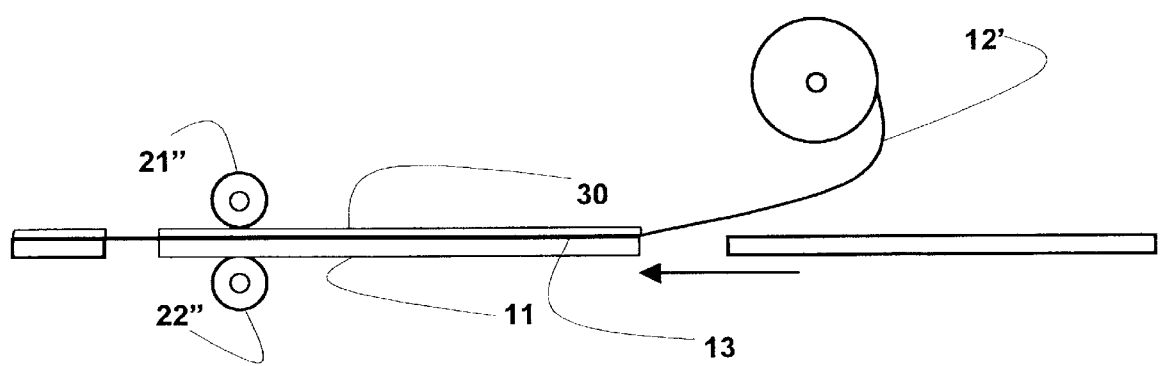
FIG. 4 is a sectional view illustrating how the protection layer is ensured to perfectly stick on the tempered glass layer in accordance with the above preferred embodiment.

Alternatively, since the protection layer 12 is a thin film and most of the tempered glass layers 11 to be used to make the patio tabletop glass contain decorative patterns on the surfaces, as shown in FIG. 4, in order to ensure the protection layer 12 being completely attached on the tempered glass layer 11 under even tension, the step (e-3) can be modified to use a pair of hard rollers 21", 22" to substitute the pair of rubber rollers 21, 22. However, a pressure board 30, such as a cardboard or a soft pad made of foam or rubber material having a thickness of about 2 mm, should be placed on top of the protection layer 12 before feeding between the pair of hard rollers 21", 22", wherein the pressure board 30 can not only protect the protection layer 12 but also transfer the greater pressing force applied by the hard rollers 21", 22" to even pressure for attaching the protection layer 12 on the tempered glass layer 11.

In view of above, when the patio tabletop glass 10 is broken into pieces and particles, the top surfaces of each of the broken glass pieces and particles will still be individually attached to the protection layer 12 so as to prevent the broken glass pieces and particles from breaking apart and falling down. In other words, the present invention provides an effective way to solve the conventional glass breaking problem. Moreover, the manufacturing process of the patio tabletop glass is fast and inexpensive and adapted for mass production.

What is claimed is:

1. A manufacturing process of a patio tabletop glass, comprising the steps of:
   (a) fully cleaning at least a top surface of a tempered glass layer having a central hole thereon;
   (b) drying said tempered glass layer after cleaning;
   (c) heating said entire tempered glass layer to a temperature between 45° C. to 65° C.;
   (d) evenly applying a layer of acrylic adhesive on said top surface of said tempered glass layer which temperature is maintained between 45° C. to 65° C. to form an adhesive layer;
   (e) attaching said protection layer having a thickness of 0.3 to 0.8 mm and a width size larger than said tempered glass layer on top of said adhesive layer of said tempered glass layer by pressing said protection layer against said top surface of said tempered glass layer which is maintained at said temperature of 45° C. to 65° C. until said protection layer is integrally attached on said tempered glass layer, wherein said protection layer has a circular center portion formed above said central hole of said tempered glass layer;
   (f) cutting excessive edges of said protection layer to a size identical to said tempered glass layer;
   (g) pressing said center,portion of said protection layer toward said central hole of said tempered glass layer to increase a tension of a peripheral portion of said protection layer around said central hole of said tempered glass layer and to extend and attach said protection layer to an upper edge of said central hole of said tempered glass layer, and
   (h) grinding said upper edge of said central hole of said tempered glass layer until said center portion of said protection layer is separated from said protection layer to form a center hole coaxially aligned with said central hole of said tempered glass layer.

2. The manufacturing process as recited in claim 1 wherein, in the step (h), a rotating sand wheel is used to grind at a position of said corresponding upper edge of said central hole so as to reduce said thickness of said peripheral edge of said center portion until said center portion of said protection layer is separated from said protection layer to form said center hole coaxially aligned with said central hole of said tempered glass layer.

3. The manufacturing process as recited in claim 1 wherein, in step (a), said top surface of said tempered glass layer is cleaned with neutral water having a pH of 7.

4. The manufacturing process as recited in claim 1 wherein, in the step (g), said center portion of said protection layer is pressed by a press mold, which has a round shaped presser head at one end thereof, towards said central hole of said tempered glass layer, wherein an inward pressing force of said pressing head further presses said peripheral portion of said protection layer to extend and attach to said upper edge of said central hole of said tempered glass layer.

5. The manufacturing process as recited in claim 4, wherein, in the step (h), a rotating sand wheel is used to grind at a position of said corresponding upper edge of said central hole so as to reduce said thickness of said peripheral edge of said center portion until said center portion of said protection layer is separated from said protection layer to form said center hole coaxially aligned with said central hole of said tempered glass layer.

6. The manufacturing process as recited in claim 1 wherein a bottom surface of said continuous protection layer is provided with a layer of acrylic adhesive to facilitate said continuous protection layer to adhere to said tempered glass layers.

7. The manufacturing process as recited in claim 6, wherein, in the step (g), aid center portion of said protection layer is pressed by a press mold, which has a round shaped presser head at one end thereof, towards said central hole of said tempered glass layer, wherein an inward pressing force of said pressing head further presses said peripheral portion of said protection layer to extend and attach to said upper edge of said central hole of said tempered glass layer.

8. The manufacturing process as recited in claim 7, wherein, in the step (h), a rotating sand wheel is used to grind at a position of said corresponding upper edge of said central hole so as to reduce said thickness of said peripheral edge of said center portion until said center portion of said protection layer is separated from said protection layer to form said center hole coaxially aligned with said central hole of said tempered glass layer.

9. The manufacturing process as recited in claim 8 wherein, in step (a), said top surface of said tempered glass layer is cleaned with neutral water having a pH of 7.

10. The manufacturing process as recited in claim 1, before the step (a), further comprising the step of providing a plurality of said tempered glass layers each having a predetermined shape and a width size.

11. The manufacturing process as recited in claim 10, wherein said step (a) further comprises said steps of cutting a large piece of glass board to form a circular shaped glass layer having a specific decorative pattern provided on at least said top surface, drilling said central hole in said glass layer and tempering said glass layer by heating said glass layer to about 500° C. –550° C. and then immediately cooling down to 0° C. –40° C. to form said tempered glass layer.

12. The manufacturing process as recited in claim 10, wherein said step (e) further comprises the steps of:

(e-1) evenly applying said layer of acrylic adhesive on said top surface of each of said tempered glass layers to form said adhesive layer having a thickness of 0.1 to 0.2 mm;

(e-2) providing a roll of continuous protection layer having a thickness of 0.3 to 0.8 mm and a width size larger than that of said tempered glass layers;

(e-3) feeding one end of said protection layer and said plurality of tempered glass layers one after one between a pair of parallel rollers, wherein said continuous protection layer is attached on said top of said adhesive layers of said tempered glass layers in overlapped manner, wherein said pair of parallel rollers are arranged to press said continuous protection layer against said top surfaces of said tempered glass layers, which are still maintained at said temperature of 45° C. to 65° C., until said continuous protection layer is integrally adhered on said top surface of each of said tempered glass layers; and (e-4) cutting off said continuous protection layer according to a total number of said tempered glass layers into a plurality of said protection layers.

13. The manufacturing process as recited claim 12, wherein each of said pair of rollers is a rubber roller.

14. The manufacturing process as recited in claim 12, wherein, in the step (h), a rotating sand wheel is used to grind at a position of said corresponding upper edge of said central hole so as to reduce said thickness of said peripheral edge of said center portion until said center portion of said protection layer is separated from said protection layer to form said center hole coaxially aligned with said central hole of said tempered glass layer.

15. The manufacturing process as recited in claim 12, wherein, in step (a), said top surface of said tempered glass layer is cleaned with neutral water having a pH of 7.

16. The manufacturing process as recited claim 12, wherein said pair of rollers are hard rollers and, in the step (e-3), a pressure board is placed on top of said protection layer before feeding between said pair of hard rollers, thereby said pressure board not only protects said protection layer but also transfers a greater pressing force applied by said hard rollers to even pressure for attaching said protection layer on said tempered glass layer.

17. The manufacturing process as recited in claim 16, wherein said pressure board is a soft pad made of foaming or rubber material.

18. The manufacturing process as recited in claim 12, wherein, in the step (g), said center portion of said protection layer is pressed by a press mold, which has a round shaped presser head at one end thereof, towards said central hole of said tempered glass layer, wherein an inward pressing force of said pressing head further presses said peripheral portion of said protection layer to extend and attach to said upper edge of said central hole of said tempered glass layer.

19. The manufacturing process as recited in claim 18, wherein, in the step (h), a rotating sand wheel is used to grind at a position of said corresponding upper edge of said central hole so as to reduce said thickness of said peripheral edge of said center portion until said center portion of said protection layer is separated from said protection layer to form said center hole coaxially aligned with said central hole of said tempered glass layer.

* * * * *